United States Patent
Bou Daher et al.

(10) Patent No.: US 10,964,305 B2
(45) Date of Patent: Mar. 30, 2021

(54) MITIGATING IMPACT OF DOUBLE TALK FOR RESIDUAL ECHO SUPPRESSORS

(71) Applicant: BOSE CORPORATION, Framingham, MA (US)

(72) Inventors: Elie Bou Daher, Marlborough, MA (US); Cristian M. Hera, Lancaster, MA (US)

(73) Assignee: BOSE CORPORATION, Framingham, MA (US)

(*) Notice: Subject to any disclaimer, the term of this patent is extended or adjusted under 35 U.S.C. 154(b) by 0 days.

(21) Appl. No.: 16/416,539

(22) Filed: May 20, 2019

(65) Prior Publication Data

US 2020/0372891 A1 Nov. 26, 2020

(51) Int. Cl.
*H04M 9/08* (2006.01)
*G10K 11/178* (2006.01)
*G10L 21/0232* (2013.01)

(52) U.S. Cl.
CPC .... *G10K 11/17853* (2018.01); *G10L 21/0232* (2013.01); *H04M 9/082* (2013.01); *G10K 2210/505* (2013.01)

(58) Field of Classification Search
CPC .... H04M 9/082; H04M 1/6041; H04M 3/002; H04M 3/568; G10L 21/0264; G10L 21/0232; G10L 21/02; G10L 2021/02082; H04R 3/005; H04R 1/406
USPC .............. 381/66, 83, 93; 379/406.01–406.16
See application file for complete search history.

(56) References Cited

U.S. PATENT DOCUMENTS

| | | | |
|---|---|---|---|
| 5,146,470 | A | 9/1992 | Fujii et al. |
| 5,371,789 | A | 12/1994 | Hirano |
| 5,400,394 | A | 3/1995 | Raman et al. |
| 5,641,927 | A | 6/1997 | Pawate et al. |
| 5,671,287 | A | 9/1997 | Gerzon |
| 5,960,077 | A | 9/1999 | Ishii et al. |
| 6,041,290 | A | 3/2000 | Mall et al. |

(Continued)

FOREIGN PATENT DOCUMENTS

| | | |
|---|---|---|
| EP | 2984763 A1 | 2/2016 |
| JP | 2011166484 A | 8/2011 |
| WO | 2014168618 A1 | 10/2014 |

OTHER PUBLICATIONS

Beaugeant et al., "New optimal filtering approaches for hands-free telecommunication terminals", Signal Processing (1998), pp. 33-47.

(Continued)

*Primary Examiner* — Disler Paul
(74) *Attorney, Agent, or Firm* — Lando & Anastasi, LLP (57) ABSTRACT

A method of suppressing residual echo includes calculating a spectral mismatch of an acoustic echo canceler based upon a program content signal and a residual signal; determining a set of filter coefficients based at least in part upon a selected spectral mismatch; filtering the residual signal based upon the set of filter coefficients; freezing the calculation of the selected spectral mismatch in response to detecting a double talk condition in the residual signal; waiting a predetermined hold period in response to detecting that the double talk condition has ended; and, after the predetermined hold period, resuming the calculation of the spectral mismatch based upon the program content signal and the residual signal.

17 Claims, 8 Drawing Sheets

(56) References Cited

U.S. PATENT DOCUMENTS

| | | |
|---|---|---|
| 6,185,300 B1 | 2/2001 | Romesburg |
| 6,438,225 B1 | 8/2002 | Tahernezhaadi |
| 6,539,091 B1 | 3/2003 | Schuller |
| 6,570,985 B1 | 5/2003 | Romesburg |
| 6,574,337 B1 | 6/2003 | Kawada |
| 6,658,107 B1 | 12/2003 | Sorqvist et al. |
| 6,799,062 B1 | 9/2004 | Piket et al. |
| 6,842,516 B1 | 1/2005 | Armbruster |
| 7,050,575 B1 | 5/2006 | Romesburg |
| 7,062,041 B2 | 6/2006 | Buchner et al. |
| 7,310,425 B1 | 12/2007 | Benesty et al. |
| 7,359,504 B1 | 4/2008 | Reuss et al. |
| 7,672,445 B1 | 3/2010 | Zhang et al. |
| 7,680,265 B2 | 3/2010 | Piket et al. |
| 8,233,632 B1 | 7/2012 | MacDonald et al. |
| 8,295,493 B2 | 10/2012 | Faller |
| 8,947,992 B2 | 2/2015 | Little et al. |
| 9,071,900 B2 | 6/2015 | Vesa et al. |
| 9,832,569 B1 | 11/2017 | Ayrapetian et al. |
| 9,854,378 B2 | 12/2017 | Sun et al. |
| 10,367,948 B2 | 7/2019 | Wells-Rutherford et al. |
| 2001/0024499 A1 | 9/2001 | Hasegawa |
| 2004/0264686 A1* | 12/2004 | Enzner ............... H04M 9/082 379/406.08 |
| 2005/0063536 A1 | 3/2005 | Myllyla et al. |
| 2005/0129226 A1 | 6/2005 | Piket et al. |
| 2005/0175129 A1 | 8/2005 | Roovers et al. |
| 2005/0213747 A1 | 9/2005 | Popovich et al. |
| 2007/0019803 A1 | 1/2007 | Merks et al. |
| 2007/0076891 A1 | 4/2007 | Cho |
| 2007/0258514 A1 | 11/2007 | Wajcer et al. |
| 2008/0031467 A1 | 2/2008 | Haulick et al. |
| 2008/0101622 A1 | 5/2008 | Sugiyama |
| 2008/0112569 A1 | 5/2008 | Asada |
| 2008/0219463 A1 | 9/2008 | Liu et al. |
| 2008/0273714 A1 | 11/2008 | Hartung |
| 2009/0055170 A1 | 2/2009 | Nagahama |
| 2009/0074177 A1 | 3/2009 | Takada |
| 2009/0147975 A1 | 6/2009 | Horbach et al. |
| 2009/0232297 A1 | 9/2009 | Takada |
| 2009/0304198 A1 | 12/2009 | Herre et al. |
| 2010/0046762 A1 | 2/2010 | Henn et al. |
| 2010/0074432 A1 | 3/2010 | Adeney |
| 2010/0074433 A1 | 3/2010 | Zhang et al. |
| 2010/0150376 A1 | 6/2010 | Itou |
| 2010/0215184 A1 | 8/2010 | Buck et al. |
| 2010/0303228 A1 | 12/2010 | Zeng et al. |
| 2011/0019831 A1 | 1/2011 | Liu |
| 2011/0058667 A1 | 3/2011 | Takada |
| 2011/0081024 A1 | 4/2011 | Soulodre |
| 2011/0135105 A1 | 6/2011 | Yano |
| 2011/0178798 A1 | 7/2011 | Flaks et al. |
| 2012/0027216 A1 | 2/2012 | Tirry et al. |
| 2012/0040757 A1 | 2/2012 | Page |
| 2012/0076308 A1 | 3/2012 | Kuech et al. |
| 2012/0093348 A1 | 4/2012 | Li |
| 2012/0140940 A1 | 6/2012 | Hwang et al. |
| 2012/0330652 A1 | 12/2012 | Turnbull et al. |
| 2013/0022206 A1 | 1/2013 | Thiergart et al. |
| 2013/0251169 A1 | 9/2013 | Awano et al. |
| 2013/0268267 A1 | 10/2013 | Hwang et al. |
| 2013/0301840 A1 | 11/2013 | Yemdji et al. |
| 2013/0304480 A1 | 11/2013 | Kuntz et al. |
| 2013/0315408 A1 | 11/2013 | Yano et al. |
| 2014/0112496 A1 | 4/2014 | Murgia et al. |
| 2014/0270148 A1 | 9/2014 | Cleve |
| 2014/0286497 A1 | 9/2014 | Thyssen et al. |
| 2014/0334620 A1* | 11/2014 | Yemdji ............... H04R 3/02 379/406.08 |
| 2014/0335917 A1 | 11/2014 | Tetelbaum et al. |
| 2014/0357324 A1 | 12/2014 | Ahgren |
| 2015/0112672 A1* | 4/2015 | Giacobello ......... G10L 21/0208 704/233 |
| 2015/0197195 A1 | 7/2015 | Hera et al. |
| 2015/0215722 A1 | 7/2015 | Milne et al. |
| 2015/0371658 A1 | 12/2015 | Gao |
| 2016/0019909 A1 | 1/2016 | Shi et al. |
| 2016/0127535 A1 | 5/2016 | Theverapperuma et al. |
| 2016/0182770 A1 | 6/2016 | Ushakov |
| 2016/0232920 A1 | 8/2016 | Matheja et al. |
| 2016/0261951 A1 | 9/2016 | Matheja et al. |
| 2016/0309119 A1 | 10/2016 | Lasser |
| 2017/0006373 A1 | 1/2017 | Bruss |
| 2017/0047072 A1 | 2/2017 | Eriksson |
| 2017/0214800 A1 | 7/2017 | Nagai |
| 2018/0027125 A1 | 1/2018 | Petri et al. |
| 2018/0040333 A1* | 2/2018 | Wung ................. G10L 21/0232 |
| 2018/0343345 A1 | 11/2018 | Awano et al. |
| 2018/0367674 A1* | 12/2018 | Schalk-Schupp ........................... G10L 21/0264 |
| 2019/0045065 A1 | 2/2019 | Hera et al. |
| 2019/0045066 A1 | 2/2019 | Hera |
| 2019/0104360 A1 | 4/2019 | Bou Daher et al. |

OTHER PUBLICATIONS

Bendat et al., "Random Data Analysis and Measurement Procedures", Wiley (2010), Chapter 7, section 7.1, pp. 201-206.

Doclo et al., "Combined acoustic echo and noise reduction using GSVD-based optimal filtering", 2000 IEEE International Conference on Acoustics, Speech, and Signal Processing. Proceedings (Cat. No. 00CH37100), vol. 2, pp. II1061-II1064. doi: 10.1109/ICASSP.2000.859146. Retrieved from <https://pdfs.semanticscholar.org/1784/8d74d9049f759e9eb4b0822201eb3bd9da07.pdf>.

Emura et al. "A Method for Posterior Frequency-Domain Multi-Channel Residual Echo Canceling", IEEE International Conference on Acoustics, Speech and Signal Processing (2011), pp. 421-424.

Emura, S. "Residual Echo Reduction for Multichannel Acoustic Echo Cancelers With a Complex-Valued Residual Echo Estimate", IEEE/ACM Transactions on Audio, Speech, and Language Processing (2018) vol. 26, No. 3, pp. 485-500.

Hansler et al., "Acoustic Echo and Noise Control: A Practical Approach", Wiley & Sons (2004), Chapter 10, section 10.2, pp. 244-247.

Le Bouquin Jeannès et al., "Combined Noise and Echo Reduction in Hands-Free Systems: A Survey", IEEE Transactions on Speech and Audio Processing (Nov. 2001), vol. 9, pp. 808-820.

Ochiai et al., "Echo Canceller with Two Echo Path Models", IEEE Transaction on Communications (1977), pp. 589-595.

\* cited by examiner

MITIGATING IMPACT OF DOUBLE TALK FOR RESIDUAL ECHO SUPPRESSORS

TECHNICAL FIELD

Aspects and examples of the present disclosure are directed generally to voice and audio systems and methods, and in some examples, more specifically to systems and methods for removing acoustic echo signals from microphone signals.

BACKGROUND

Audio systems, especially automobile audio systems, are used to produce acoustic signals for various purposes such as entertainment (e.g., music, talk radio, sports), navigation (e.g., route guidance), and communication (e.g., telephone calls). Some such audio systems include one or more microphones intended to pick up a user's voice for certain applications, such as the near end of a telephone call or for commands to a virtual personal assistant. The acoustic signals produced by the audio system also contribute to the microphone signals, and may undesirably interfere with processing the user's voice signal.

SUMMARY

Audio residual echo suppression systems and methods that calculate and store spectral mismatch data for use at a later time are disclosed in U.S. Patent Publication No. 2019/0045066 (the "'066 Publication"), titled MITIGATING IMPACT OF DOUBLE TALK FOR RESIDUAL ECHO SUPPRESSORS filed on Aug. 3, 2017 and published on Feb. 7, 2019, which publication is hereby incorporated by reference in its entirety for all purposes.

A double talk detector may not perfectly or instantaneously detect when a user starts to speak. Accommodations may be made for any delay in detecting a double talk condition, or changing sound stage rendering parameters or configurations, by storing previously determined spectral mismatches and selecting from among them at the onset of detecting double talk. A residual echo suppression post filter may use calculated filter coefficients that are attenuation multipliers for a number of individual frequency bins. The filter coefficients may be calculated or determined from, at least in part, a detected mismatch between an echo cancelation filter and an actual echo path, e.g., the echo cancelation filter may not perfectly model the actual echo path, resulting in residual echo. The spectral mismatch may be optimally determined for a particular sound stage rendering scheme and while a user is not speaking. A double talk detector may be used to indicate the presence of a user's speech signal and to pause the calculation of spectral mismatch at the onset of the detection of double talk, and select from previously determined spectral mismatches until the double talk condition is no longer present.

The systems and methods presently disclosed correct for errors in transfer function mismatch estimates when a double-talk condition has ended, namely, during a transition from a double-talk condition to a single-talk condition. In particular, when a first double-talk period has ended, the spectral mismatch calculation may be resumed. Time smoothing constants may be used in calculating the spectral mismatch as a time-weighted value based upon the ratio of power spectral densities for a most recent interval as well as a previously calculated spectral mismatch.

If the spectral mismatch calculation is resumed too quickly after the first double-talk period has ended or if the time smoothing constants are inappropriate, however, the initial time-weighted spectral mismatch calculation(s) may still be corrupted by the speech component that occurred during the first double-talk period. Furthermore, if a second double-talk period occurs before the speech component is smoothed out of the spectral mismatch calculation, the calculation may be frozen, thereby prolonging the error by applying the corrupted spectral mismatch value for the duration of the second double-talk period. Calculating filter coefficients using a corrupt spectral mismatch value in this manner may lead to either an over suppression of the speech signal or an under-suppression of the residual echo.

Presently disclosed systems and method correct for these errors in transfer function mismatch estimates. In some examples, calculation of the spectral mismatch may be resumed only after a delay period following the detected end of the double-talk period. The delay period may cause enough time to pass that when the spectral mismatch calculation is resumed, it is not corrupted by the speech component occurring during the double-talk period. In some examples, time smoothing constants may be selected based on a current status of being in a single-talk period or a transition from a double-talk period to a single-talk period. During the single-talk period, a "longer" time smoothing constant (e.g., one that applies a relatively lower weight to a current or most recent interval) may be selected, allowing for more accurate spectral mismatch estimates. During a transition from double-talk to single-talk, however, a shorter time smoothing constant (e.g., one applying a relatively higher weight to a current or most recent interval) may be selected, allowing the speech component to be smoothed out of the spectral mismatch more quickly. As the transition proceeds into a single-talk period, one or more longer time smoothing constants may be applied, allowing for more accurate spectral mismatch estimates as the risk of corruption from the speech component recedes.

According to one aspect, a method of suppressing residual echo is provided. The method includes calculating a spectral mismatch of an acoustic echo canceler based upon a program content signal and a residual signal; determining a set of filter coefficients based at least in part upon a selected spectral mismatch; filtering the residual signal based upon the set of filter coefficients; freezing the calculation of the selected spectral mismatch in response to detecting a double talk condition in the residual signal; waiting a predetermined hold period in response to detecting that the double talk condition has ended; and after the predetermined hold period, resuming the calculation of the spectral mismatch based upon the program content signal and the residual signal.

According to one example, the spectral mismatch is a ratio of a cross power spectral density of the residual signal and the program content signal to a power spectral density of the program content signal. According to a further example, the predetermined hold period is proportional to a time smoothing constant used during calculation of the spectral mismatch. According to a still further example, the method includes detecting a current condition comprising one of a double talk condition, a single talk condition, and a transition condition from the double talk condition to the single talk condition; and calculating the power spectral density of the residual signal using a smoothing factor selected from a plurality of smoothing factors, the selected smoothing factor corresponding to the current condition.

According to another example, the method further includes accessing, during the double talk condition and the predetermined hold period, a second spectral mismatch stored in a memory prior to an onset of the double talk condition. According to another example, the set of filter coefficients corresponds to a set of frequency bins in the residual signal. According to still another example, the spectral mismatch is a moving average over a previous time period representing a single talk condition.

According to one example, the method further includes calculating a spectral mismatch for each of a plurality of channels of an acoustic echo canceler based upon a program content signal and a residual signal; and determining a set of filter coefficients for each of the plurality of channels based at least in part upon the spectral mismatch.

According to another aspect, a residual echo suppression system is provided. The system includes a content signal input configured to receive an audio signal; a residual input configured to receive a residual signal from an acoustic echo canceler; and a processor configured to execute a spectral analyzer configured to calculate a spectral mismatch of the acoustic echo canceler based upon a program content signal and a residual signal; determine a set of filter coefficients based at least in part upon a selected spectral mismatch; filter the residual signal based upon the set of filter coefficients; freeze the calculation, by the spectral analyzer, of the selected spectral mismatch in response to detecting a double talk condition in the residual signal; wait a predetermined hold period in response to detecting that the double talk condition has ended; and after the predetermined hold period, resume the operation of the spectral analyzer.

According to one example, the spectral mismatch is a ratio of a cross power spectral density of the residual signal and the program content signal to a power spectral density of the program content signal. According to a further example, the predetermined hold period is proportional to a time smoothing constant used during calculation of the spectral mismatch. According to another example, the processor is further configured to detect a current condition comprising one of a double talk condition, a single talk condition, and a transition from the double talk condition to the single talk condition; and calculate the cross power spectral density of the residual signal and the program content signal using a smoothing factor selected from a plurality of smoothing factors, the selected smoothing factor corresponding to the current condition.

According to another example, the system includes a memory, wherein the processor is further configured to access, during the double talk condition and the predetermined hold period, a second spectral mismatch stored in the memory prior to an onset of the double talk condition. According to still another example, the set of filter coefficients corresponds to a set of frequency bins in the residual signal. According to another example, the spectral mismatch is a moving average over a previous time period representing a single talk condition.

According to one example, the processor is configured to execute a coefficient calculator to determine the set of filter coefficients based upon the spectral mismatch, wherein the operation of the coefficient calculator is not frozen during the double talk condition.

According to another example, the processor is further configured to calculate a spectral mismatch for each of a plurality of channels of an acoustic echo canceler based upon a program content signal and a residual signal; and determine a set of filter coefficients for each of the plurality of channels based at least in part upon the spectral mismatch.

According to another aspect, a method of suppressing residual echo is provided. The method includes detecting a current condition comprising one of a double talk condition, a single talk condition, and a transition condition from the double talk condition to the single talk condition; receiving, from an acoustic echo canceler, a residual signal; and calculating the power spectral density of the residual signal using a smoothing factor selected from a plurality of smoothing factors, the selected smoothing factor corresponding to the current condition.

According to one example, the plurality of smoothing factors includes a double talk smoothing factor corresponding to the double talk condition, a single talk smoothing factor corresponding to the single talk condition, and a transition smoothing factor corresponding to the transition condition.

According to another example, the transition smoothing factor is less than the double talk smoothing factor and the single talk smoothing factor.

Still other aspects, examples, and advantages are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Aspects of the present disclosure are directed to audio systems and methods that provide echo reduction. Acoustic echo cancelers may fail to completely remove an echo component in a microphone signal, leaving a residual echo component. Aspects and examples disclosed herein reduce (e.g., suppress) the residual echo in the microphone signal after the action of one or more acoustic echo cancelers, and are adapted to improve performance after a double talk condition has ended, during a transition to a single talk condition.

Audio systems, especially automotive audio systems, may produce acoustic signals in an environment, e.g., a vehicle compartment, for the benefit of people in the environment. The acoustic signals may be for entertainment, information, communication, and navigation, for example. Such audio systems may also accept acoustic input from the occupants, e.g., one or more people may verbally speak and their voices may be picked up by the audio system, e.g., via one or more microphones, for various purposes such as telephone conversations, verbal commands to a navigation system or a virtual personal assistant, and the like. When the audio system renders an acoustic signal, e.g., via a loudspeaker, the microphone(s) may also pick up the rendered acoustic signal in addition to the user's voice. For example, the user may be having a phone conversation and listening to the radio at the same time, and the microphone will pick up both the user's voice and the radio program. A portion of the microphone signal may therefore be due to the audio system's own acoustic production, and that portion of the microphone signal is deemed an echo signal. In such cases, an acoustic echo canceler may be used to reduce or remove the echo signal portion from the microphone signal. When multiple loudspeakers and/or multiple audio signal sources are used, there may be multiple acoustic echo cancelers involved. After the action of one or more echo cancelers, a portion of the echo signal may remain, and is deemed a residual echo. Aspects and examples disclosed herein suppress the residual echo by applying a post filter ("post" refers to the filter's action occurring after the echo canceler). The post filter applies spectral enhancement to reduce (suppress) spectral content that is likely due to residual echo and not a user's vocalizations, thereby enhancing the speech content in the signal relative to the non-speech content.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace examples including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
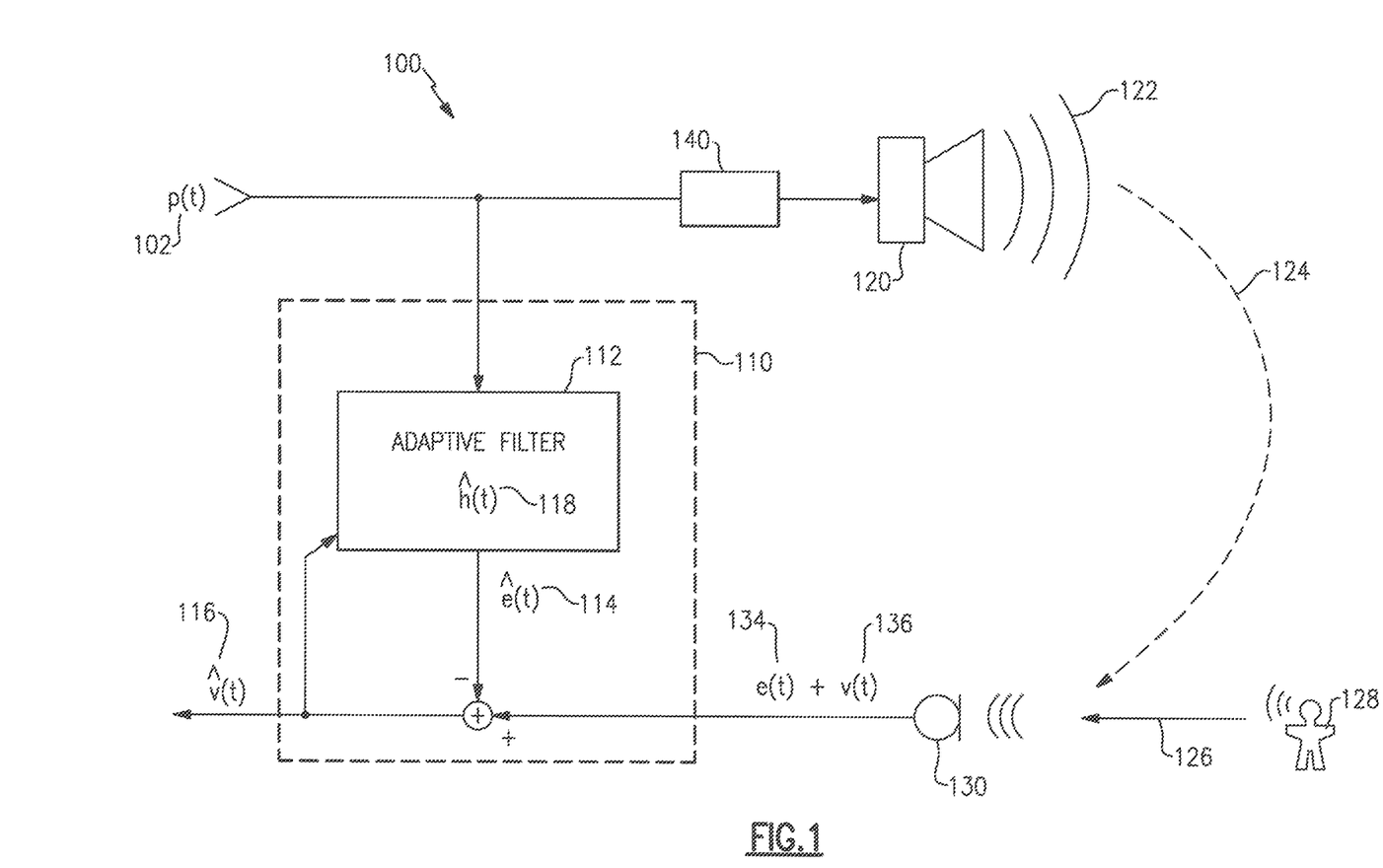
FIG. 1 is a schematic diagram of an example audio system including echo cancelation.

FIG. 1 illustrates an example audio system 100 that includes an echo canceler 110, one or more acoustic drivers 120, and one or more microphones 130. The audio system 100 receives a program content signal 102, p(t), that is converted into an acoustic program signal 122 by the one or more acoustic drivers 120. The acoustic drivers 120 may have further processing component(s) 140 associated with them, such as may provide array processing, amplification, equalization, mixing, etc. Additionally, the program content signal 102 may include multiple tracks, such as a stereo left and right pair, or multiple program content signals to be mixed or processed in various ways. The program content signal 102 may be an analog or digital signal and may be provided as a compressed and/or packetized stream, and additional information may be received as part of such a stream, such as instructions, commands, or parameters from another system for control and/or configuration of the processing component(s) 140, the echo canceler 110, or other components.

The block diagrams illustrated in the figures, such as the example audio system 100 of FIG. 1, are schematic representations and not necessarily illustrative of individual hardware elements. For instance, in some examples, each of the echo canceler(s) 110, the processing component(s) 140, and other components and/or any portions or combinations of these, may be implemented in one set of circuitry, such as a digital signal processor, a controller, or other logic circuitry, and may include instructions for the circuitry to perform the functions described herein.

A microphone, such as the microphone 130, may receive each of an acoustic echo signal 124, an acoustic voice signal 126 from a user 128, and other acoustic signals such as background noise and/or road noise. The microphone 130 converts acoustic signals into, e.g., electrical signals, and provides them to the echo canceler 110. Specifically, when a user 128 is speaking, the microphone 130 provides a voice signal 136, v(t), and an echo signal 134, e(t), as part of a combined signal to the echo canceler 110. The echo canceler 110 functions to attempt to remove the echo signal 134 from the combined signal to provide an estimated voice signal 116, v̂(t). The echo canceler 110 works to remove the echo signal 134 by processing the program content signal 102 through a filter 112 to produce an estimated echo signal 114, ê(t), which is subtracted from the signal provided by the microphone 130.

For example, the acoustic program signal 122 causes the echo signal 134. If the filter 112 performs well at providing an estimated echo signal 114, it will perform well at removing the echo signal 134 from the signal provided by the microphone 130. As a result, the estimated voice signal 116, v̂(t), will be a good representation of the actual voice signal 136, v(t).

The echo canceler 110 may include an adaptive algorithm to update the filter 112, at intervals, to improve the estimated echo signal 114. Over time, the adaptive algorithm causes the filter 112 to converge on satisfactory parameters that produce a sufficiently accurate estimated echo signal 114. Generally, the adaptive algorithm updates the filter during times when the user 128 is not speaking, but in some examples the adaptive algorithm may make updates at any time. When the user 128 speaks, such is deemed "double talk," and the microphone 130 picks up both the acoustic echo signal 124 and the acoustic voice signal 126. Regarding the terminology, the user 128 is "talking" at the same time as one or more acoustic drivers 120 are producing acoustic program content, or "talking," hence, "double talk."

The filter 112 may apply a set of filter coefficients to the program content signal 102 to produce the estimated echo signal 114, ê(t). The adaptive algorithm may use any of various techniques to determine the filter coefficients and to update, or change, the filter coefficients to improve performance of the filter 112. In some examples, the adaptive algorithm may operate on a background filter, separate from the filter 112, to seek out a set of filter coefficients that performs better than an active set of coefficients being used in the filter 112. When a better set of coefficients is identified, they may be copied to the filter 112 in active operation.

Such adaptive algorithms, whether operating on an active filter or a background filter, may include, for example, a least mean squares (LMS) algorithm, a normalized least mean squares (NLMS) algorithm, a recursive least square (RLS) algorithm, or any combination or variation of these or other algorithms. The filter 112, as adapted by the adaptive algorithm, converges to apply an estimated transfer function 118, ĥ(t), which is representative of the overall response of the processing 140, the acoustic driver(s) 120, the acoustic environment, and the microphone(s) 130, to the program content signal 102. The transfer function is a representation of how the program content signal 102 is transformed from its received form into the echo signal 134.

While the echo canceler 110 works to remove the echo signal 134 from the combined microphone signal, rapid changes and/or non-linearities in the echo path prevent the echo canceler 110 from providing a precise estimated echo signal 114 to perfectly match the echo signal 134, and a residual echo will remain at the output. According to aspects and examples enclosed herein, the residual echo is reduced, or suppressed, by the addition of a post filter to spectrally enhance the estimated voice signal 116.

Figure 2:
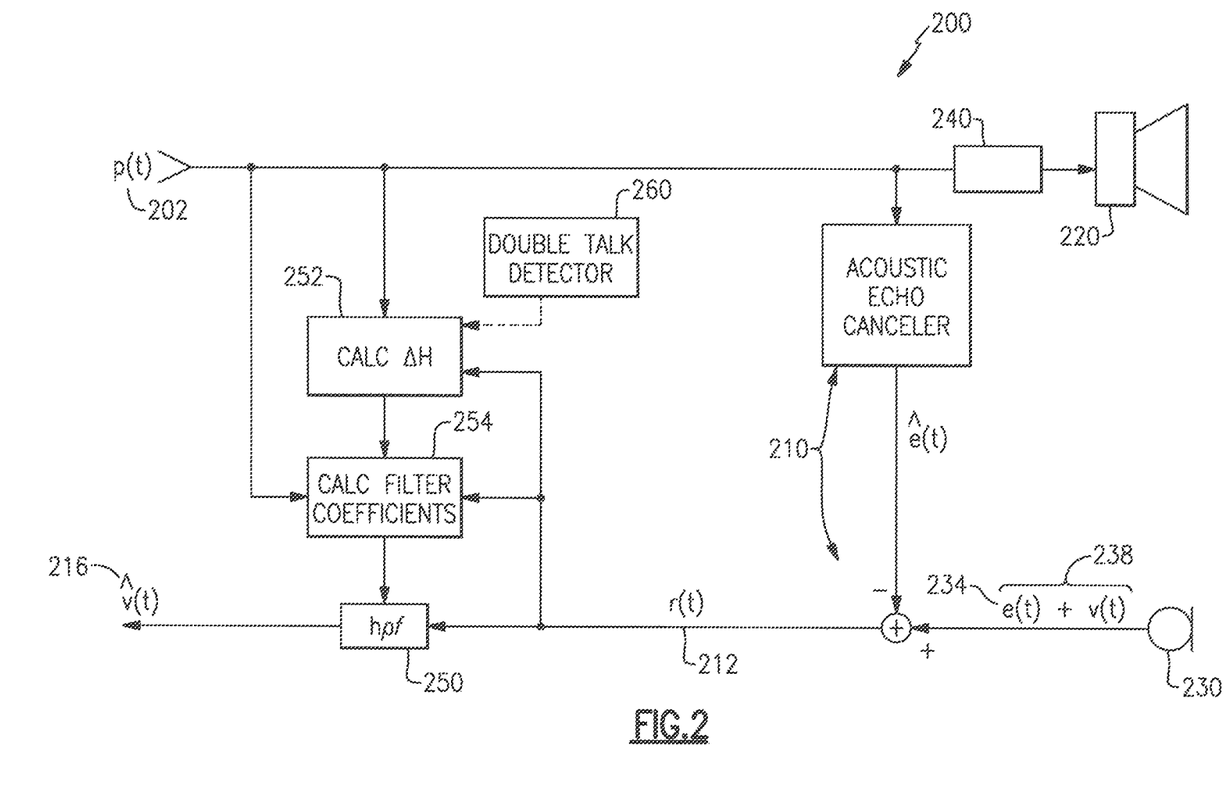
FIG. 2 is a schematic diagram of an example audio system including residual echo suppression.

FIG. 2 illustrates an example audio system 200 that includes an echo canceler 210, one or more acoustic drivers 220, one or more microphones 230, audio signal processing 240, and a post filter 250. Similar to the audio system 100 of FIG. 1, the audio system 200 receives a program content signal 202 and converts it into an acoustic program signal by the one or more acoustic drivers 220, and the echo canceler 210 operates to remove or reduce an echo signal 234 from a combined signal 238 provided by the microphone 230. The resulting signal 212 may include a residual echo component, as discussed above. The post filter 250 operates to suppress the residual echo component with spectral filtering.

The post filter 250 is supported by a spectral analysis block 252 that characterizes the spectral power and/or spectral content of the resulting signal 212 relative to the program content signal 202. The spectral analysis block 252 calculates a spectral mismatch, ΔH, (also termed echo mismatch herein) between the actual echo path and the acoustic echo canceler 210. The actual echo path is, for example, the entire path taken by the program content signal 202 from where it is provided to the echo canceler 210, through the processing 240, the acoustic driver 220, the acoustic environment, and through the microphone 230. The actual echo path may further include processing by the microphone 230 or other supporting components, such as array processing, for example.

To determine the spectral mismatch, the spectral analysis block 252 calculates a ratio of power spectral density of the resulting (residual) signal 212 to the power spectral density of the program content signal 202, across a number of frequency blocks or bins. In simplified mathematical terms, the spectral analysis block 252 calculates ΔH at intervals, in accord with equation (1).

$$\Delta H = \frac{S_{pr}}{S_{pp}} \quad (1)$$

Wherein $S_{pr}$ is the cross power spectral density between the program content signal 102 and the resulting (or residual) signal 212 (from the echo canceler 210), and $S_{pp}$ is the power spectral density of the program content signal 202, which is the ultimate source of the echo. In some examples, the power spectral densities used may be time-averaged or otherwise smoothed or low pass filtered to prevent sudden changes (e.g., rapid or significant changes) in the calculated spectral mismatch.

To accurately calculate the echo mismatch, the spectral analysis block 252 may be configured to calculate the echo mismatch only during periods when a double talk condition is not detected, e.g., by a double talk detector 260. For example, when a user is speaking within the acoustic environment of the audio system 200, the resulting signal 212 includes a component that is the user's speech. In this case, the resulting signal 212 is not representative of the residual echo, e.g., the mismatch of the echo canceler 210 relative to the actual echo path, because the user is speaking. Accordingly, the double talk detector 260 operates to indicate when double talk is detected, and the spectral analysis block 252 may stop calculating ΔH during such periods.

In some examples, the spectral analysis block 252 may be further configured to reduce errors that arise in calculating ΔH during a single talk period following a double talk period. In some examples, the spectral analysis block 252 may delay resuming calculation of ΔH for a defined delay period after detecting that the double talk period has ended. The freezing of the calculation of ΔH may be delayed for some amount of time beyond the end of detected double talk period. The delay period may be a time period of sufficient length that when calculation of ΔH resumes, the speech component detected during the double talk period will no longer be a factor. The length of the delay period may depend on a number of factors, including one or more characteristics of the program content signal 202, such as signal strength; power spectral density; characteristics of the voice component, such as volume and pitch of the speech component of the combined signal 238 or the resulting signal 212; or characteristics of the environment (e.g., an automobile passenger compartment). The length of the delay period may be predetermined, and may be dynamically adjusted based on these or other factors.

Regarding the use of symbols herein, a capital letter, e.g., H, generally represents a term, signal, or quantity in the frequency or spectral domain, and a lowercase letter, e.g., h, generally represents a term, signal, or quantity in the time domain. Relation between time and frequency domain is generally well known, and is described at least under the realm of Fourier mathematics or analysis, and is accordingly not presented herein. Additionally, signals, transfer functions, or other terms or quantities represented by symbols herein may be operated, considered, or analyzed in analog or discrete form. In the case of time domain terms or quantities, the analog time index, e.g., t, and/or discrete sample index, e.g., n, may be interchanged or omitted in various cases. Likewise, in the frequency domain, analog frequency indexes, e.g., f, and discrete frequency indexes, e.g., k, are omitted in most cases. Further, relationships and calculations disclosed herein may generally exist or be carried out in either time or frequency domains, and either analog or discrete domains, as will be understood by one of skill in the art. Accordingly, various examples to illustrate every possible variation in time or frequency domains, and analog or discrete domains, are not presented herein.

As discussed above with reference to equation (1), the spectral analysis block 252 calculates the spectral mismatch, ΔH, across a number of frequency blocks or bins. Any number of frequency bins, across any suitable range of frequencies, may be selected to accommodate varying system requirements. For instance, in certain examples the power spectral density of signals may be taken across 64 frequency bins. In other examples, the signals may be analyzed across any suitable number of frequency bins, or a system adjustable number of frequency bins, for example from 32 frequency bins up to 256 frequency bins or more. Further, the frequency range may be limited to those frequencies deemed important for particular applications, such as the processing of human speech, which generally only requires a narrower frequency range than that which humans are capable of hearing. Accordingly, for example, the program content signal 202 may include content across a spectrum of 20 Hz to 20,000 Hz, while the microphone 230, the echo canceler 210, the post filter 250, and the spectral analysis block 252, may be configured to operate on a more limited frequency range, such as up to 5 kHz, 11 kHz, or 12 kHz, for example. In other examples, suitable frequency ranges may include 60 Hz to 8,000 Hz, or 100 Hz to 4,000 Hz, or any other suitable range depending upon the application. A selection of number of frequency bins may be related to a selection of frequency range in some examples, depending upon operating requirements. A broader frequency range may require a higher number of frequency bins to achieve a particular spectral resolution, for example.

As discussed above, the post filter 250 operates to suppress residual echo that is often the result of rapid changes and/or non-linearities in the acoustic environment, such as caused by a person moving his arms or turning his head, for example. Accordingly, the post filter 250 may be required to change its operating characteristics more quickly than, for example, an adaptive algorithm associated with the echo canceler 210. The spectral analysis block 252 may therefore be configured to calculate the spectral mismatch, ΔH, at a rather rapid rate, over short time intervals, e.g., many times per second.

As noted above, in some examples, the ratio of power spectral densities, as described by equation (1), may be time averaged over a number of calculations, and the time-averaged result may be used as the spectral mismatch, ΔH. For example, the spectral analysis block 252 may calculate a new spectral mismatch, ΔH, at each interval, according to equation (2), where the newly calculated spectral mismatch, ΔH(n), is based upon the ratio of power spectral densities as presented above with respect to equation (1), and the previously calculated spectral mismatch, ΔH(n−1), as well as a time-averaging weighting factor, δ. In other examples, the intervally calculated spectral mismatch may not be time averaged, or may be time averaged by some other suitable function.

$$\Delta H(n) = (1-\delta) \cdot \frac{S_{pr}}{S_{pp}} + \delta \cdot \Delta H(n-1) \quad (2)$$

Acknowledging the above discussion that the spectral analysis block 252 may be configured to stop calculating new spectral mismatches when double talk is detected, equation (2) may be re-written as equation (3).

$$\Delta H(n) = \begin{cases} (1-\delta) \cdot \frac{S_{pr}}{S_{pp}} + \delta \cdot \Delta H(n-1) & \text{far end single talk} \\ \Delta H(n-1) & \text{otherwise} \end{cases} \quad (3)$$

As discussed in more detail below, the time-averaging factor δ (or a time-averaging factor $\delta_{spr}$ specific to calculation of $S_{pr}$) may be selected from among a number of values based on one of the following states:

$$\delta_{spr} = \begin{cases} \delta_{DT}, & \text{if } DT \\ \delta_{ST}, & \text{if } ST \\ \delta_{DT \to ST}, & \text{if } DT \to ST \end{cases} \quad (4)$$

A smaller value for the time-averaging factor will allow for faster smoothing, since relatively fewer earlier intervals are included in each iteration of ΔH. By setting $\delta_{DT \to ST}$ to a lower value, therefore, a ΔH not affected by the speech component of the combined signal 238 can be achieved more quickly (e.g., the transition period can be shortened). Conversely, by setting $\delta_{ST}$ to a higher value, a longer transition period may allow for improved accuracy of ΔH. By adjusting the value of $\delta_{spr}$ based on the state, a more optimal ΔH can be applied during steady state operation, but a shorter transition period from a double-talk condition to a single-talk condition can also be achieved.

The above discussion focuses on the operation of the spectral analysis block 252 to determine a spectral mismatch, ΔH, at any given time. Attention is now turned to the operation of the post filter 250 itself, and adaptation of the post filter 250 at particular instants in time by a coefficient calculation block 254. The post filter 250 suppresses residual echo in the resulting signal 212 (from the echo canceler 210) by, in some examples, reducing the spectral content of the resulting signal 212 by an amount related to the likely ratio of the residual echo signal power relative to the total signal power (e.g., speech and residual echo), on a per frequency bin basis.

In various examples, the post filter 250 may be configured to operate in the frequency domain or the time domain. Accordingly, use of the term "filter coefficient" is not intended to limit the post filter 250 to operation in the time domain. The terms "filter coefficients," "tap weights," or other comparable terms, may refer to any set of values applied to or incorporated into a filter to cause a desired response or a desired transfer function. In certain examples, the post filter 250 may be a digital frequency domain filter that operates on the resulting signal 212 to multiply signal content within a number of individual frequency bins by distinct values generally less than or equal to unity. The set of distinct values may be deemed filter coefficients.

In at least one example, the coefficient calculation block 254 calculates and provides to the post filter 250 a set of frequency bin multipliers based upon the calculated spectral mismatch, which may be a frozen or previously calculated quantity, and based upon current or timely spectral content information about the program content signal 202 and the resulting signal 212. The most recently calculated spectral mismatch, as discussed above, may be a frozen value due to the spectral analysis block 252 stopping new calculations when double talk is detected, or during a transition from a double-talk condition to a single-talk condition. The current power spectral densities of the resulting signal 212 and the program content signal 202, however, continue to change at each moment in time.

Accordingly, in certain examples when such conditions are detected, the spectral analysis block 252 stops calculating, or freezes, the spectral mismatch, $\Delta H$, while the coefficient calculation block 254 continues to calculate and provide filter coefficients to the post filter 250. The post filter 250 may continuously update its operation based upon the current power spectral densities of the resulting signal 212 and the program content signal 202.

As discussed above, the spectral analysis block 252 may stop calculating spectral mismatch during double talk. Because the resulting signal 212 contains more than a residual echo when a user starts to speak, the spectral analysis block 252 might otherwise calculate incorrect spectral mismatches, which cause the coefficient calculation block 254 to calculate less optimal filter coefficients and ultimately cause the post filter 250 to perform less well. In some cases, the post filter 250 may perform so poorly under such conditions that its output estimated voice signal 216 may be a worse representation of the user's voice than if there were no post filter 250 at all.

The spectral analysis block 252 may also stop calculating spectral mismatch during a transition from double talk to single talk. Because the spectral analysis block 252 calculates the spectral mismatch using time weighting by taking into account previous intervals, some of those previous intervals may be corrupted by the speech component occurring during the double talk condition. This corruption may cause the coefficient calculation block 254 to calculate less optimal filter coefficients and ultimately cause the post filter 250 to perform less well. In some cases, the post filter 250 may perform so poorly under such conditions that its output estimated voice signal 216 may be a worse representation of the user's voice than if there were no post filter 250 at all.

Figure 3:
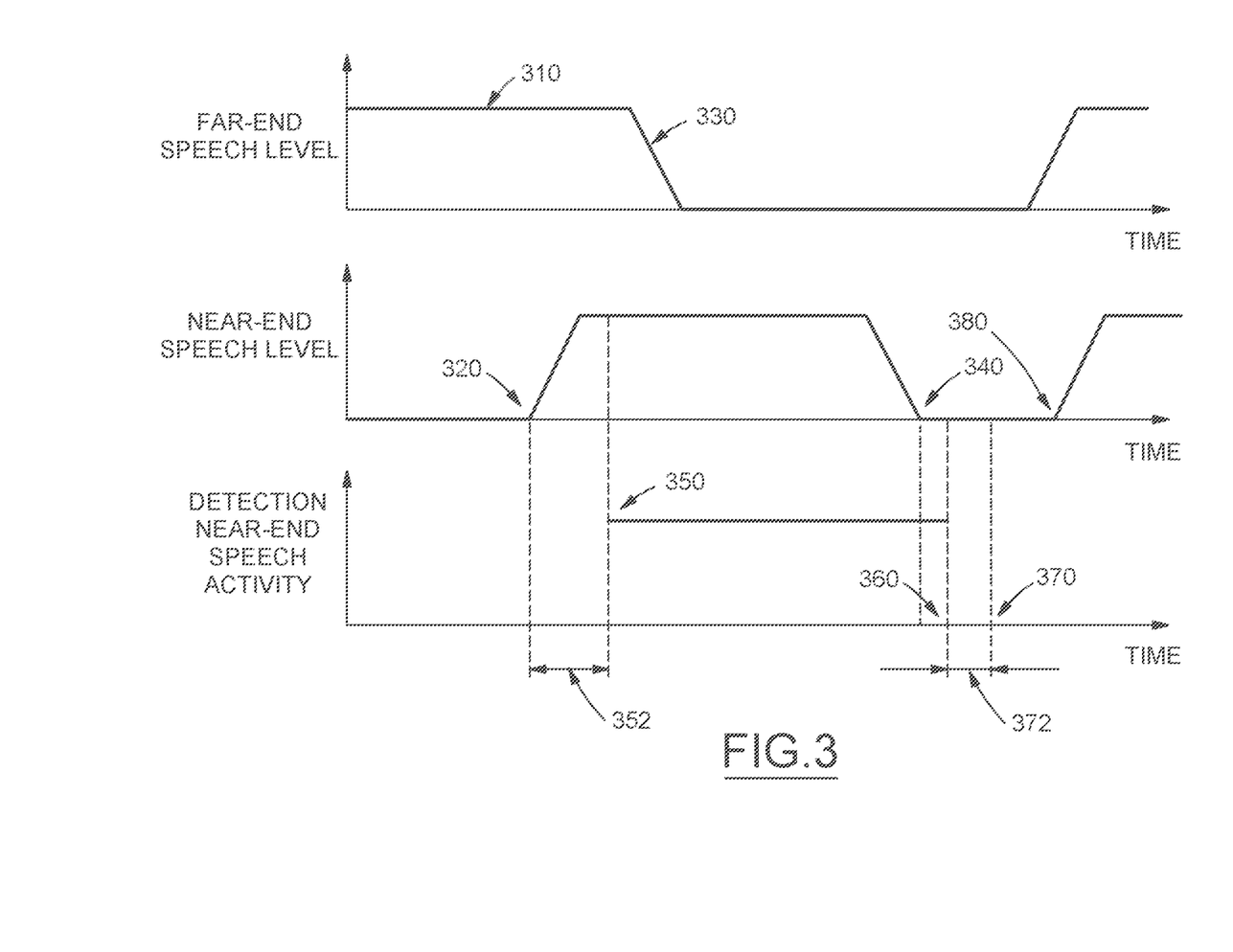
FIG. 3 is a timing diagram of audio system signals and events for an example use scenario.

FIG. 3 shows an example timing of audio system signals and events for a sample telephone conversation. A far end user is talking during a period 310. The far end user is the remote half of the telephone conversation, and is a person with whom a near end user is having a conversation. The near end user begins talking at point 320, perhaps causing the far end user to stop talking at point 330. While the near end user is speaking, from point 320 to point 340, newly calculated spectral mismatches may be inaccurate due to the presence of the near end user's voice in a microphone signal, e.g., in addition to an echo signal. A double talk detector cannot instantly detect that the near end user is speaking at point 320, and may not indicate the near end speech activity until point 350, after a delay 352. Additionally, a short period after the near end user stops talking at point 340, the double talk detector may indicate no further near end speech activity at point 360.

At point 350, the double talk detector indicates the onset of a double talk condition and the calculation of spectral mismatches is stopped. The most recently calculated spectral mismatch, however, may not be representative of the residual echo in the system because the, e.g., resulting signal 212 of FIG. 2, included components of the near end user's voice when the spectral mismatch was calculated, just before the point 350 of double talk detection. Instead, the most accurate spectral mismatch will be the last one calculated before the near end user started talking at point 320.

At point 360, once the double talk detector has indicated no further near end speech activity, a delay period 372 may represent the time during which resumed calculation of the spectral mismatch $\Delta H$ using a given value of $\delta_{spr}$ may be corrupted by the speech component occurring during the double-talk period from point 350 to point 340. During the delay period 372, calculation of $\Delta H$ may remain frozen, with a previously calculated value (e.g., one calculated before point 320) being used.

At point 370, after the delay period 372 has expired, calculation of $\Delta H$ may resume. The length of the delay period 372 may be dependent on the applied value of $\delta_{spr}$; a higher value of $\delta_{spr}$ will require a longer transition period to smooth the speech component out of the time-weighted calculation of $\Delta H$. A lower value of $\delta_{spr}$, on the other hand, may allow for an uncorrupted calculation of $\Delta H$ between point 360 (the end of the first double-talk period) and the start of a second double-talk period 380. Upon an indication by the double talk detector that the second double-talk period 380 has begun, calculation of $\Delta H$ may again be frozen as detailed herein.

Audio systems and methods in accord with aspects and examples disclosed herein may include a storage memory for storing previously calculated spectral mismatches. Timing or timestamp information may be associated with the stored spectral mismatches, e.g., by express storage of timing information or by management of storage locations according to a timing scheme or other means. A coefficient calculation block may retrieve earlier calculated spectral mismatch data, especially when a newly indicated double talk condition is detected, selected based upon the delay 352 between the near end user starting to talk and the double talk detector indicating such. In some examples, the earlier calculated spectral mismatch data may be selected based upon an estimate of the delay 352. The coefficient calculation block may then calculate new filter coefficients for a post filter based upon the retrieved earlier calculated spectral mismatch data, at least for so long as the double talk condition continues to be indicated.

Figure 4:
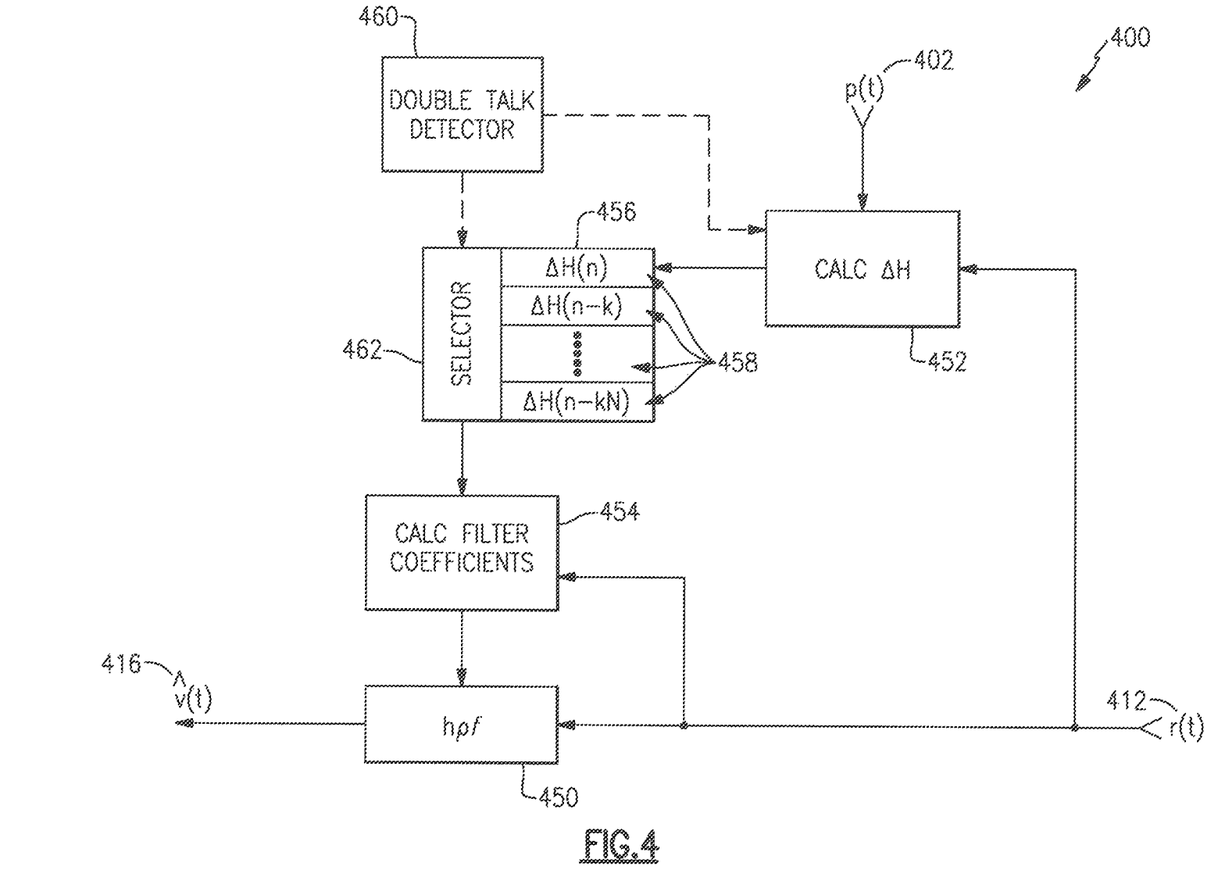
FIG. 4 is a schematic diagram of an example audio system including residual echo suppression with memory of prior spectral mismatches.

FIG. 4 illustrates a portion of an example audio system 400 that includes memory 456 for storing spectral mismatch data 458. Like the audio system 200 of FIG. 2, the audio system 400 receives a residual signal 412, which is a resulting signal after processing by an echo canceler, and spectrally processes it through a post filter 450 to produce a voice estimate signal 416. The post filter 450 is a time varying filter that applies filter coefficients calculated by a coefficient calculation block 454. The coefficient calculation block 454, however, does not necessarily use the most recent spectral mismatch calculated by the spectral analysis block 452. Instead, the coefficient calculation block 454 may use previously stored spectral mismatch data 458, based upon the likelihood that the most recently calculated spectral mismatch may not be reliable, or may be less than optimal. The most recently calculated spectral mismatch, $\Delta H$, may be less than optimal if it was calculated while a user was speaking, possibly due to a delay in the double talk detector 460 to detect and indicate the double talk condition, such as the delay 352 shown in FIG. 3.

Previously calculated spectral mismatch data 458 may be stored in memory 456 at fixed or variable intervals, and not all calculated spectral mismatches are necessarily stored in memory 456. For example, every tenth spectral mismatch may be stored in memory 456, or other fractional storage rates may be used. In some examples, the spectral analysis block 452 may calculate a spectral mismatch, ΔH, at fixed intervals, for example once every millisecond. Alternately, the spectral analysis block 452 may calculate a spectral mismatch at varying intervals, such as more often when the audio system is playing at higher volume or when the program content signal 402 quickly changing spectral content, or a combination of these and/or other conditions, and may calculate a spectral mismatch less often when such conditions are not the case. In some examples, storage of calculated spectral mismatches may occur at fixed intervals while spectral mismatches may be calculated at variable intervals. In various examples, spectral mismatch data may be calculated based upon any suitable fixed or variable interval and based upon fixed time elements and/or varying conditions, and calculated spectral mismatch data may be stored at any suitable fixed or variable interval and/or based upon variable conditions, as discussed in more detail below. Additionally, there may be a maximum amount of stored spectral mismatch data 458 held in memory 456, which may be based upon a furthest back amount of time expected to be necessary to accommodate, e.g., a double talk detector delay such as the delay 352 of FIG. 3.

For example, when the double talk detector 460 indicates that a double talk condition exists, e.g., that a local user is talking, a selector 462 may select or determine a stored spectral mismatch 458 from the memory 456 to be used by the coefficient calculation block 454. In some examples, the selector 462 may select a stored spectral mismatch 458 based upon a fixed amount of prior time. In other examples, the selector 462 may select a stored spectral mismatch 458 based upon a variable amount of time related to other factors. For instance, if the audio system 400 is playing audio content at a high volume, such that the double talk detector 460 is likely to take longer to detect a local user talking, the selector 462 may select a stored spectral mismatch 458 from further back in time. The memory 456, and the stored spectral mismatch data 458, may be managed in numerous ways. For example, a time stamp may be stored with each instance of stored spectral mismatch data 458. Alternately, stored spectral mismatch data 458 may be stored in order, such that a timing associated with each instance of stored spectral mismatch data 458 is identifiable or determined from its storage location within the memory 456.

As discussed above, the selector 462 may select a stored spectral mismatch 458 based upon a fixed or variable amount of time. In certain examples, the double talk detector 460 may be previously characterized, e.g., tested, to determine a typical and/or a longest amount of time for its operation to reliably detect double talk, and the selector 462 may be configured to select stored spectral mismatch data 458 reaching back that determined amount of time. In some examples, the memory 456 may be a first-in-first-out (FIFO) memory, or have alternate shift register type of functionality, and may be configured to hold a fixed amount of stored spectral mismatch data 456. The fixed amount may be associated with the determined typical or maximum amount of time to reliably detect double talk, or may be another amount. In these examples, the selector 462 may be configured to apply a simple binary decision as to which spectral mismatch data to use, e.g., use the incoming, i.e., most recently calculated, spectral mismatch when double talk is not indicated and use the outgoing spectral mismatch when double talk is indicated. In some examples, the size of the memory may be adjustable such that the fixed amount may be changed to accommodate varying fixed time intervals, depending upon, for example, playback volume, background noise level, or other conditions.

In some examples, the selector 462 may be configured to select a stored spectral mismatch 458 based upon a fixed time interval, e.g., reaching back in time, in the range of 5 milliseconds to 400 milliseconds, for example. In other examples, the selector 462 may go back a fixed time interval in the range of 60 milliseconds to 800 milliseconds, or in a range of 25 milliseconds to 250 milliseconds, or a fixed interval of 100 milliseconds, or any other suitable fixed time interval. In other examples, the selector 462 may be configured to select a stored spectral mismatch 458 based upon a variable time interval of, e.g., up to 50 or 100 milliseconds when a playback volume is low, a background noise level is low, or based on any other suitable condition(s), and, e.g., as much as 300 milliseconds, 400 milliseconds, 600 milliseconds, or even more when a playback volume is high, a background noise level is high, or based on any other suitable condition(s). The selected stored spectral mismatch data 458 may be determined in part by a selector 462, such as logic circuitry, program instructions, or any combination of these, which may function in combination with the structure of the memory 456 and/or a memory management scheme and/or other portions or components of the audio system 400 to provide a spectral mismatch to the coefficient calculation block 454.

Figure 5A:
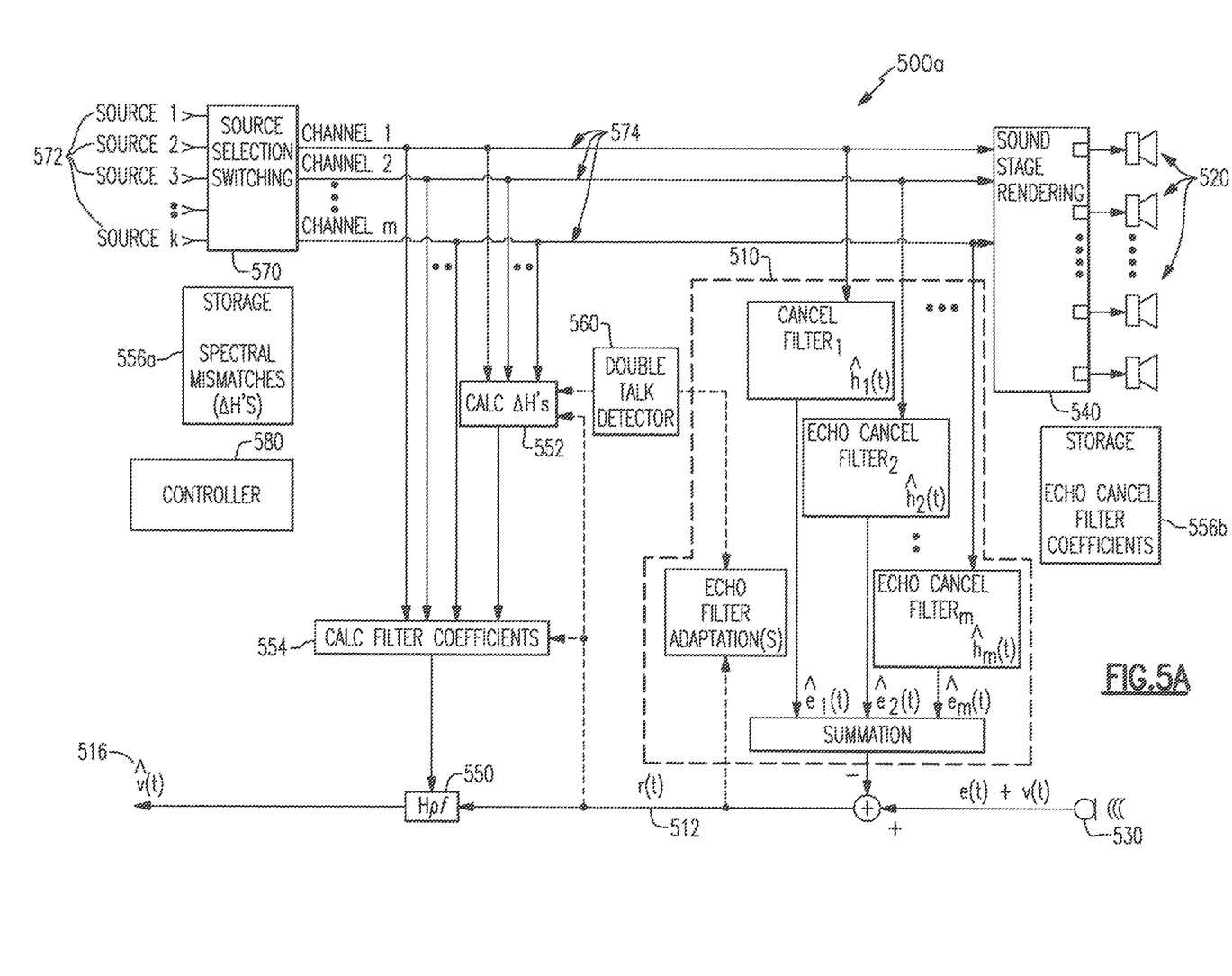
FIG. 5A is a schematic diagram of an example audio system including multi-channel echo cancelation and residual echo suppression.

FIG. 5A illustrates application of post filtering residual echo suppression in a multi-channel audio system in accord with aspects and examples disclosed herein. FIG. 5A shows an example multi-channel audio system 500a that includes source selection switching 570 to allow selection from among multiple sources 572 to provide one or more program content signals to individual content channels 574 for rendering as acoustic signals. The audio system 500a also includes a sound stage processor 540 to control a number of acoustic transducers 520, at least one microphone input and/or microphone 530 to pick up acoustic signals in the environment, including user voices and audio system echoes, an echo cancelation subsystem 510 for estimating the echo signal content of the audio signal provided by the microphone 530, and a post filter 550. The audio system 500a also includes components that support the post filter 550, including a spectral analysis subsystem 552, spectral mismatch storage 556a, coefficient calculation block 554, and a double talk detector 560. Additionally, the audio system 500a includes a controller 580 to manage one or more components of the source selection switching 570, the sound stage processor 540, the echo cancelation subsystem 510, the post filter 550 and supporting components, the double talk detector 560, and/or other components.

In some examples, the echo cancelation subsystem 510, spectral analysis subsystem 552, and the coefficient calculation block 554 may operate on signals or signal channels after processing by the sound stage processor 540, rather than prior to sound stage processing as shown in the figures. For example, the echo cancelation subsystem 510, spectral analysis subsystem 552, and the coefficient calculation block 554 may operate on signals provided directly to the acoustic transducers 520, before or after amplification. In other examples, there may be various signal processing before, after, or both before and after the provision of such signals to the echo cancelation subsystem 510, spectral analysis subsystem 552, and the coefficient calculation block 554.

In some examples, the microphone 530 may be an array of microphones, having array processing to steer beams toward sources of desired acoustic signals and/or away from noise sources, and may additionally or alternately steer nulls toward noise sources. In such examples, the controller 580 may further control such array processing components, or such array processing components may be alternately controlled and/or may be pre-configured for various operating characteristics.

Any of the sources 572 may include hardware for providing an audio signal, such as a radio tuner, navigation system, telephone system, and the like, or may include inputs to accept audio signals from an external device. For example, any of the sources 572 may include one or more physical electrical connections or wireless connections, or any combination of wired and wireless connections, and may include network interfaces to receive (and optionally to provide) various audio signals. Examples include audio jacks, such as 3.5 mm audio jacks, for example, Bluetooth® wireless interfaces and hardware, or the like, network interface jacks and/or connectors, such as an RJ-45 connector, for example, and wireless local area network (WLAN) interfaces and hardware, or any combination of these or other interfaces suitable for conveying audio signal content. Various of these or other interfaces may also include inputs to receive commands and control parameters, such as filter settings, equalization, volume control, or other sound stage parameters, etc.

The echo cancelation subsystem includes a number of echo cancelation filters, each of which is associated with a particular content channel 574. The content channels 574 provide content signals to the sound stage processor 540, from among the sources 572 (as selected by the source selection switching 570 under the control of the controller 580). The sound stage processor 540 provides various processing, such as equalization and loudspeaker routing, to drive the acoustic transducers 520 to generate acoustic sound fields in accordance with the various program content signals and sound stage parameters.

The various sources 572 may provide audio content to be rendered within the environment, such as an interior occupant compartment of a vehicle, and may include numerous types of audio sources, such as radios, telephones, navigation systems, etc. Each of the sources 572 and each sub-channel provided by the sources 572 may have differing requirements for sound stage rendering, such as equalization settings and routing to various acoustic transducers 520 or groups of acoustics transducers 520. The various echoes created or caused by the program content signal on each content channel 574 are attempted to be canceled by a respective echo canceler as part of the echo cancelation subsystem 510. As discussed above in the single-channel case, the echo cancelers may not achieve complete removal of echo signals and therefore a residual echo may remain as a component of a resulting signal 512 after action by the echo canceler subsystem.

Similar to the above audio systems 200 and 400, the example audio system 500a includes a post filter 550 to suppress residual echo in the resulting signal 512. The post filter 550 works similarly to the examples described above with reference to FIG. 2 and FIG. 4, to apply spectral enhancement to enhance any user speech content with respect to non-speech content. Unlike the audio systems 200, 400 above, however, spectral mismatch calculations and filter coefficient calculations are configured to accommodate the multiple program content signals among the multiple content channels 574.

Figure 5B:
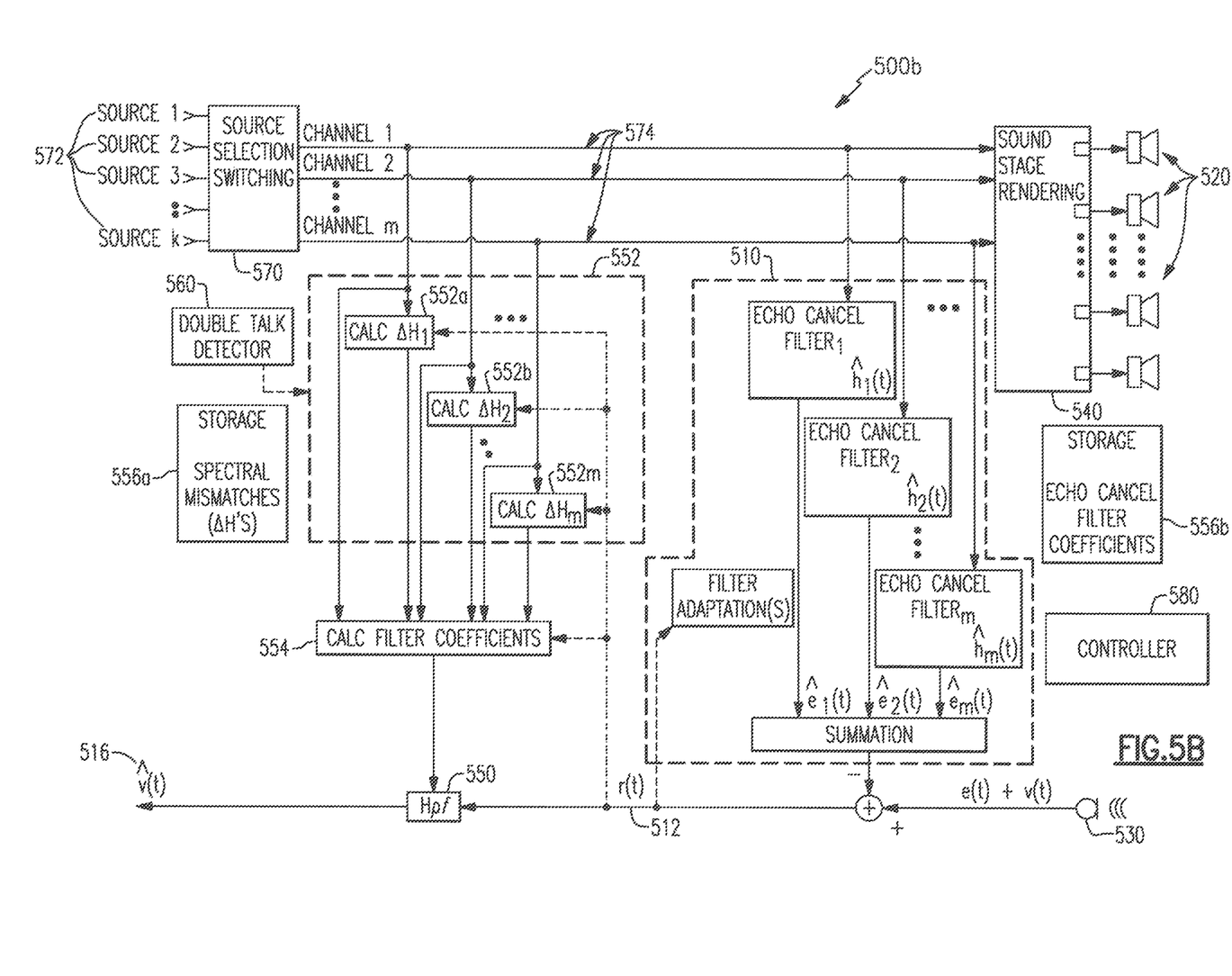
FIG. 5B is a schematic diagram of another example audio system including multi-channel echo cancelation and residual echo suppression.

The audio system 500a of FIG. 5A is generalized to multiple program content signals among the content channels 574 without regard to any relationship between the program content signals. In the case that the content channels 574 carry signals that are uncorrelated (e.g., statistically independent) the calculation of spectral mismatch values, ΔH's, may be simplified on a per-channel basis. As illustrated in FIG. 5B, a further example audio system 500b is shown that includes a spectral analysis block 552 that includes multiple sub-blocks 552a, 552b, . . . , 552m, one for each content channel 574. When the signals on each of the content channels 574 are uncorrelated, or are enforced to be uncorrelated, each of the sub-blocks 552a, 552b, . . . , 552m, may calculate a corresponding spectral mismatch, $\Delta H_i$, without regard to the signals on the other of the content channels 574. Further details regarding the calculation of multi-channel spectral mismatches, $\Delta H_i$, are discussed in U.S. Patent Publication No. 2019/0045065, titled MULTI-CHANNEL RESIDUAL ECHO SUPPRESSION, filed on Aug. 3, 2017 and published on Feb. 7, 2019, which publication is hereby incorporated by reference in its entirety for all purposes.

A further advantage that may be included in audio systems in accord with aspects and examples disclosed herein is an efficient use of spectral analysis blocks such that a large number of various sources 572 may be accommodated while including an efficient number of echo cancelers and spectral analysis blocks. For example, the storage 556 may store and retrieve filter coefficients for the echo cancelers (in storage portion 556b) and store and retrieve spectral mismatches for the spectral analysis blocks (in storage portion 556a), in association with various sound stage parameters and/or configurations. For example, a change in operational status of the audio system, such as a change requested by user input, or a change requested by one of the sources 572, may create or change one or more transfer functions tracked by one or more of the echo cancelers, and accordingly may create or change one or more residual echo characteristics of the system. In the example audio system 500a of FIG. 5A, the echo cancelation filter coefficients and residual echo spectral mismatches may be stored from a prior instant in time when the audio system was operating in a particular state, and appropriate echo cancelation filter coefficients and residual echo spectral mismatches can be retrieved from the storage 556 and loaded into the echo cancelation filters and the spectral analysis blocks, respectively, when a change of operational state is requested.

For example, a particular operational state may include source sub-channels having particular sound stage rendering parameters, and may further include particular microphone processing parameters for the microphone 530, such as array processing in some examples having numerous microphones. Accordingly, any particular set of source-stage-microphone settings may have respective "last used" filter coefficient and spectral mismatch data stored in the storage 556. The stored filter coefficient and spectral mismatch data can be retrieved when the audio system 500a is requested to operate at least one channel with the same (or similar) source-stage-microphone settings. Additionally, actively used filter coefficient and spectral mismatch data (as updated by adaptation) can be stored into the storage 556 when the audio system 500a is requested to cease operating the at least one channel with the particular source-stage-microphone settings, such as upon powering off or upon a new request to operate under different conditions.

Figure 6:
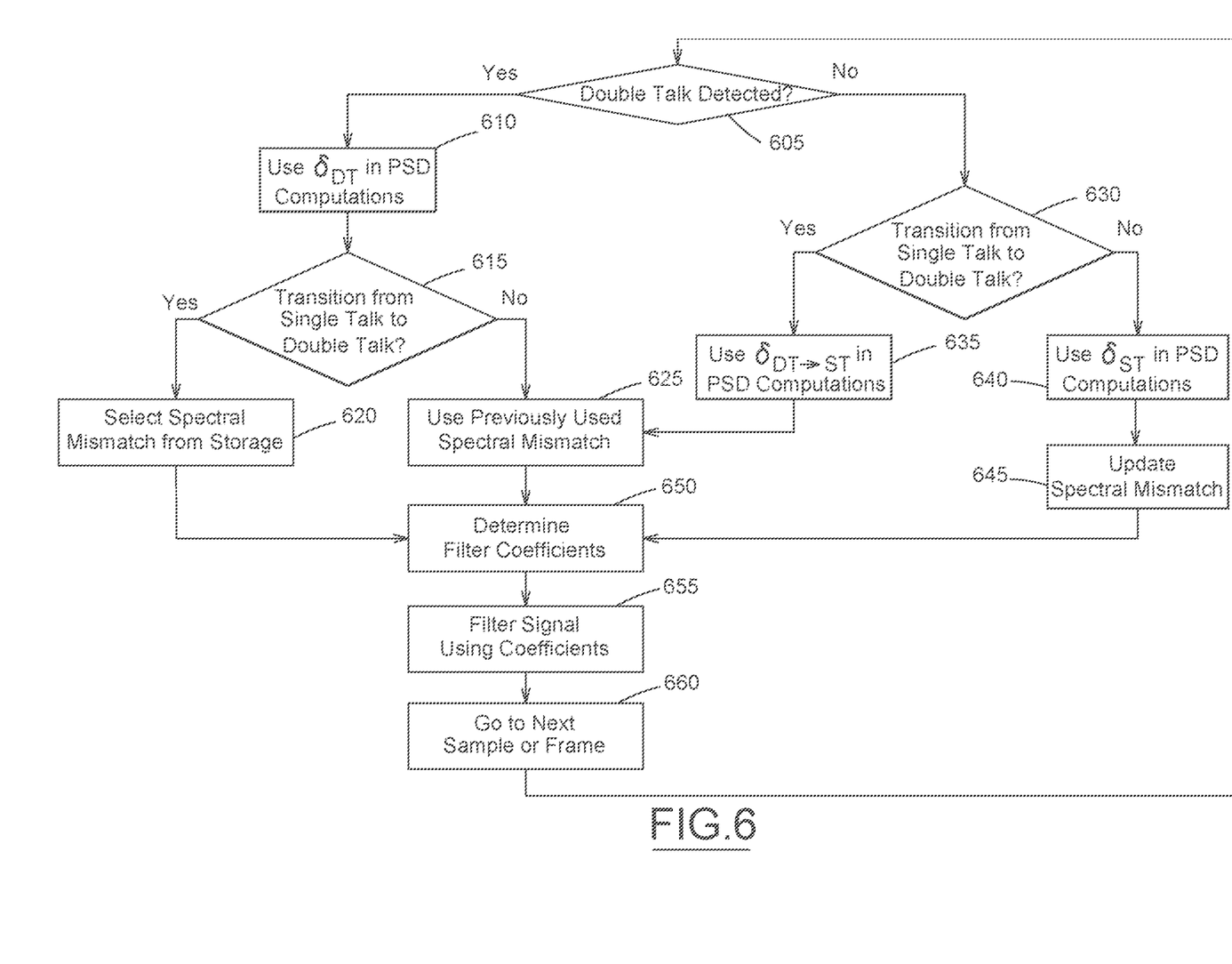
FIG. 6 is a flow diagram of an example method of suppressing residual echo in an audio system.

FIG. 6 illustrates an example operational method 600 that may be performed by an audio system such as the audio system 400 of FIG. 4 or the audio system 500a of FIG. 5A, to suppress residual echo. The method 600 includes detecting if a double talk condition is present (block 605). If so, $\delta_{DT}$ is selected for use in calculating spectral mismatch (block 610) in later blocks, as discussed with respect to equations (3) and (4) above. If a transition from single talk to double talk is occurring (block 615), then a previously stored spectral mismatch is accessed (e.g., from a memory) (block 620). If no transition is occurring, however (i.e., a steady-state double talk condition is occurring), then the previously used spectral mismatch is selected for re-use (block 625).

If a double talk condition is not detected, however (block 605), then it is determined whether a transition from a double-talk condition to a single-talk condition is occurring (block 630). If so, then $\delta_{DT \to ST}$ is selected for use in calculating spectral mismatch (block 635) in later blocks, as discussed with respect to equations (3) and (4) above. $\delta_{DT \to ST}$ may be used for a certain delay period (e.g., delay period 372 in FIG. 3) even after the transition is complete, to ensure that the transition to single talk is complete before resuming calculating the spectral mismatch in later blocks.

If no such transition is occurring (i.e., a steady-state single talk condition is occurring), then $\delta_{ST}$ is selected for use in calculating spectral mismatch (block 640) in later blocks, as discussed with respect to equations (3) and (4) above, and the spectral mismatch is updated (block 645).

Using whatever spectral mismatch is selected or generated in blocks 620, 625, or 645 above, a set of filter coefficients is determined (block 650), and the audio signal is filtered using the filter coefficients (655). The process begins again on the next sample or frame (block 660).

It will be appreciated that a smaller value for the time-averaging factor may be selected (e.g., from among $\delta_{DT}$, $\delta_{ST}$, and $\delta_{DT \to ST}$) to allow for faster smoothing, since relatively fewer earlier intervals are included in each iteration of the spectral mismatch calculation. By setting a shorter time-averaging factor during the transition, a spectral mismatch not affected by the speech component occurring during the double-talk condition can be achieved more quickly (i.e., the transition period can be shortened). Upon completing of the transition, a steady-state single-talk condition time-averaging factor (e.g., a longer time-averaging factor) may be reverted to.

Figure 7:
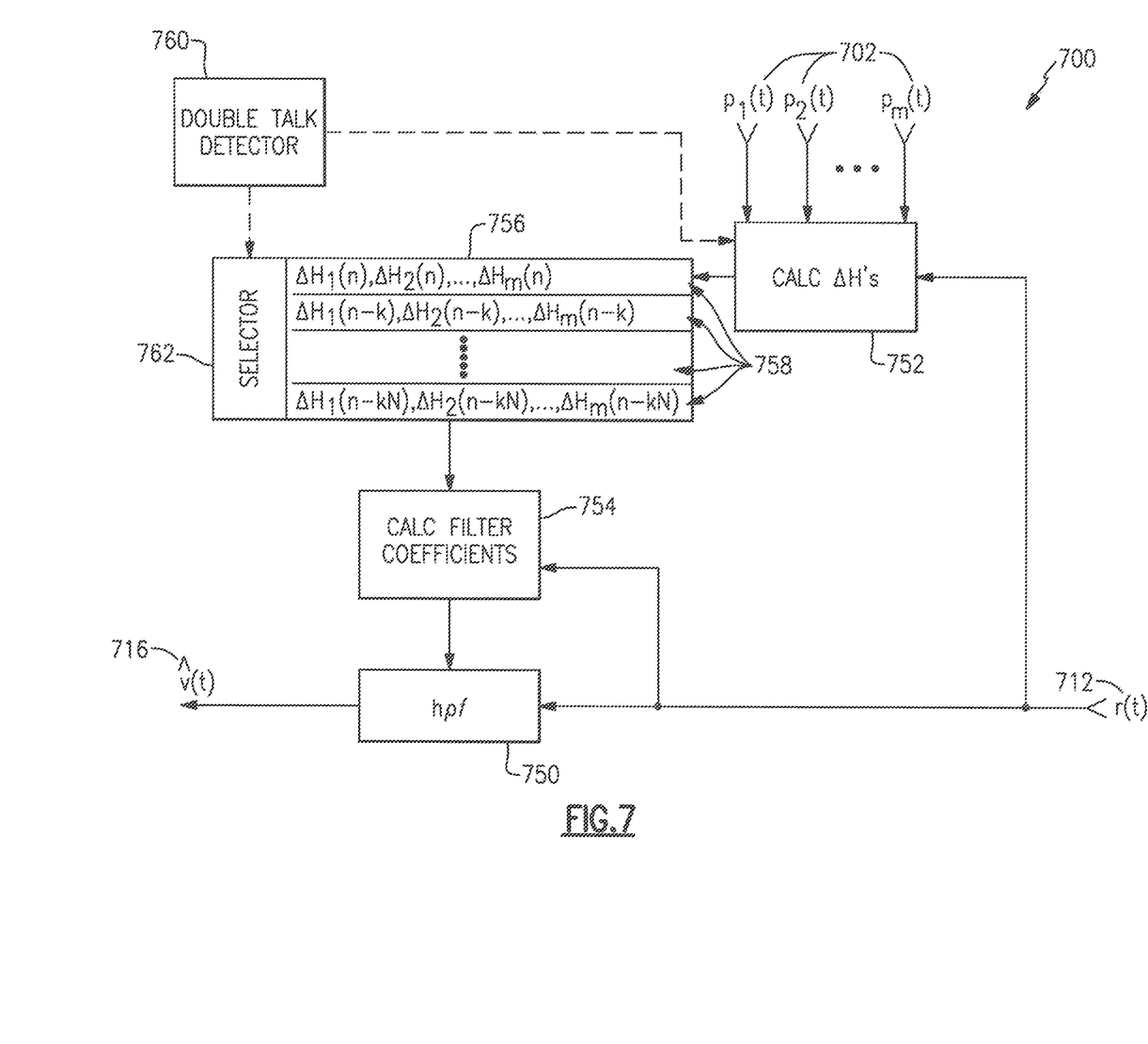
FIG. 7 is a schematic diagram of an example audio system including residual echo suppression with memory of prior spectral mismatches.

FIG. 7 illustrates a portion of an example audio system 700 that includes memory 756 for storing spectral mismatch data 758. Like the audio systems 500a, 500b of FIGS. 5A and 5B, the audio system 700 receives a residual signal 712, which is a resulting signal after processing by an echo cancelation subsystem, and spectrally processes it through a post filter 750 to produce a voice estimate signal 716. The spectral analysis subsystem 752 is a multi-channel subsystem, such as either spectral analysis subsystem 552 shown in FIG. 5A or 5B. Accordingly, the memory 756 may store multiple spectral mismatches, $\Delta H_i$, one for each channel, for each time (e.g., timestamp) for which spectral mismatches are stored. By way of comparison, the example audio system 400 of FIG. 4 stores multiple spectral mismatches over time, but for only one signal channel. Like the example audio system 400 of FIG. 4, the coefficient calculation block 754 does not necessarily use the most recent spectral mismatch calculated by the spectral analysis block 752 for each channel. Instead, the coefficient calculation block 754 may use previously stored sets of channel-specific spectral mismatch data 758, based upon the likelihood that the most recently calculated spectral mismatches may not be reliable, or may be less than optimal, such as due to a delay in the double talk detector 760 to detect and indicate a double talk condition.

With regard to all aspects and examples discussed herein, a program content signal may have any suitable spectral range, such as, for example, 20 Hz to 20,000 Hz being an acoustic range typically accepted as matching that of the human ear. In some examples, however, removing an echo signal based upon the program content signal may be limited to a narrower spectrum. In certain examples, the microphone signal may be filtered to a narrower bandwidth because it may be intended to pick up human vocal activity, and may only require a lower frequency bound as low as, e.g., 60 Hz, and/or an upper frequency bound as high as, e.g., 8,000 Hz or 10,000 Hz, for example. In certain examples, the microphone signal may be filtered, controlled, or otherwise limited to a frequency spectrum in the range of 60 Hz to 8,000 Hz, or from 100 Hz to 4,000 Hz, or any other suitable range.

In some examples, an audio system may include a plurality of acoustic drivers and/or a plurality of microphones, and may include various processing, which may include array processing, to process signals to the acoustic drivers and/or to process signals from the microphones, or a sub-set of either the acoustic drivers or microphones, as appropriate for various applications and/or changing operational requirements.

It should be understood that many, if not all, of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), micro-controller(s), and the like, or any combination of these, may be suitable, and may include analog or digital circuit components and/or other components with respect to any particular implementation. Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, driver, or loudspeaker, may be any of many types of transducers known in the art. For example, an acoustic structure coupled to a magnetic coil positioned in a magnetic field, to cause motion in response to electrical signals received by the coil, may be a suitable acoustic transducer. Additionally, a piezoelectric material may respond to electrical signals by expanding or contracting in one or more dimensions and may be a suitable acoustic transducer. In various examples, acoustic transducers may take other forms.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of suppressing residual echo, comprising:
   calculating a spectral mismatch of an acoustic echo canceler based upon a program content signal and a residual signal;
   determining a set of filter coefficients based at least in part upon a selected spectral mismatch;
   filtering the residual signal based upon the set of filter coefficients;
   freezing the calculation of the selected spectral mismatch in response to detecting a double talk condition in the residual signal;
   waiting a predetermined hold period in response to detecting that the double talk condition has ended; and
   after the predetermined hold period, resuming the calculation of the spectral mismatch based upon the program content signal and the residual signal.

2. The method of claim 1, wherein the spectral mismatch is a ratio of a cross power spectral density of the residual signal and the program content signal to a power spectral density of the program content signal.

3. The method of claim 2, wherein the predetermined hold period is proportional to a time smoothing constant used during calculation of the spectral mismatch.

4. The method of claim 2, further comprising:
   detecting a current condition comprising one of a double talk condition, a single talk condition, and a transition condition from the double talk condition to the single talk condition; and
   calculating the cross power spectral density of the residual signal and the program content signal using a smoothing factor selected from a plurality of smoothing factors, the selected smoothing factor corresponding to the current condition.

5. The method of claim 1, further comprising accessing, during the double talk condition and the predetermined hold period, a second spectral mismatch stored in a memory prior to an onset of the double talk condition.

6. The method of claim 1, wherein the set of filter coefficients corresponds to a set of frequency bins in the residual signal.

7. The method of claim 1, wherein the spectral mismatch is a moving average over a previous time period representing a single talk condition.

8. The method of claim 1, further comprising:
   calculating a spectral mismatch for each of a plurality of channels of an acoustic echo canceler based upon a program content signal and a residual signal; and
   determining a set of filter coefficients for each of the plurality of channels based at least in part upon the spectral mismatch.

9. A residual echo suppression system, comprising:
   a content signal input configured to receive an audio signal;
   a residual input configured to receive a residual signal from an acoustic echo canceler; and
   a processor configured to:
      execute a spectral analyzer configured to calculate a spectral mismatch of the acoustic echo canceler based upon a program content signal and the residual signal;
      determine a set of filter coefficients based at least in part upon a selected spectral mismatch;
      filter the residual signal based upon the set of filter coefficients;
      freeze the calculation, by the spectral analyzer, of the selected spectral mismatch in response to detecting a double talk condition in the residual signal;
      wait a predetermined hold period in response to detecting that the double talk condition has ended; and
      after the predetermined hold period, resume the operation of the spectral analyzer.

10. The system of claim 9, wherein the spectral mismatch is a ratio of a cross power spectral density of the residual signal and the program content signal to a power spectral density of the program content signal.

11. The system of claim 10, wherein the predetermined hold period is proportional to a time smoothing constant used during calculation of the spectral mismatch.

12. The system of claim 10, wherein the processor is further configured to:
   detect a current condition comprising one of a double talk condition, a single talk condition, and a transition from the double talk condition to the single talk condition; and
   calculate the cross power spectral density of the residual signal and the program content signal using a smoothing factor selected from a plurality of smoothing factors, the selected smoothing factor corresponding to the current condition.

13. The system of claim 9, further comprising a memory, wherein the processor is further configured to access, during the double talk condition and the predetermined hold period, a second spectral mismatch stored in the memory prior to an onset of the double talk condition.

14. The system of claim 9, wherein the set of filter coefficients corresponds to a set of frequency bins in the residual signal.

15. The system of claim 9, wherein the spectral mismatch is a moving average over a previous time period representing a single talk condition.

16. The system of claim 9, wherein the processor is configured to execute a coefficient calculator to determine the set of filter coefficients based upon the spectral mismatch, wherein the operation of the coefficient calculator is not frozen during the double talk condition.

17. The system of claim 9, wherein the processor is further configured to:
   calculate a spectral mismatch for each of a plurality of channels of an acoustic echo canceler based upon a program content signal and a residual signal; and
   determine a set of filter coefficients for each of the plurality of channels based at least in part upon the spectral mismatch.

* * * * *